US011425692B2

(12) United States Patent
Islam et al.

(10) Patent No.: US 11,425,692 B2
(45) Date of Patent: *Aug. 23, 2022

(54) SYNCHRONIZATION SIGNAL TRANSMISSION FOR MOBILITY

(71) Applicant: QUALCOMM Incorporated, San Diego, CA (US)

(72) Inventors: Muhammad Nazmul Islam, Littleton, MA (US); Junyi Li, Chester, NJ (US); Navid Abedini, Somerset, NJ (US); Sundar Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,140

(22) Filed: Jul. 10, 2020

(65) Prior Publication Data

US 2020/0344724 A1 Oct. 29, 2020

Related U.S. Application Data

(63) Continuation of application No. 16/027,050, filed on Jul. 3, 2018, now Pat. No. 10,750,476.

(Continued)

(51) Int. Cl.
*H04W 72/04* (2009.01)
*H04W 36/00* (2009.01)
(Continued)

(52) U.S. Cl.
CPC ....... *H04W 72/04* (2013.01); *H04W 36/0055* (2013.01); *H04W 56/0005* (2013.01);
(Continued)

(58) Field of Classification Search
CPC ............ H04W 72/04; H04W 36/0055; H04W 56/0005; H04W 74/0833; H04W 48/12;
(Continued)

(56) References Cited

U.S. PATENT DOCUMENTS 10,750,476 B2   8/2020 Islam et al.
2010/0238904 A1 9/2010 Zhang et al.
(Continued)

FOREIGN PATENT DOCUMENTS

CN   101855936 A   10/2010
CN   102769902 A   11/2012
(Continued)

OTHER PUBLICATIONS

International Search Report and Written Opinion—PCT/US2018/040833—dated ISA/EPO—dated Sep. 25, 2018.
(Continued)

*Primary Examiner* — Hardikkumar D Patel
(74) *Attorney, Agent, or Firm* — Patterson + Sheridan, L.L.P.

(57) ABSTRACT

Certain aspects of the present disclosure provide techniques for use of SS transmitted using a UE-specific configuration of time-frequency resources. A BS may assign at least one UE-specific configuration, wherein the UE-specific configuration comprises an allocation of resources for a UE-specific SS for mobility management purposes. The BS may communicate with the UE based, at least in part, on the UE-specific configuration. A UE may correspondingly receive the UE-specific configuration and communicate with a BS based, at least in part, on the configuration.

30 Claims, 12 Drawing Sheets

Related U.S. Application Data

(60) Provisional application No. 62/531,289, filed on Jul. 11, 2017.

(51) Int. Cl.
*H04W 56/00* (2009.01)
*H04W 74/08* (2009.01)
*H04W 48/12* (2009.01)

(52) U.S. Cl.
CPC ........ *H04W 74/0833* (2013.01); *H04W 48/12* (2013.01); *H04W 72/046* (2013.01)

(58) Field of Classification Search
CPC ... H04W 72/046; H04W 24/08; H04W 28/02; H04W 76/14; H04W 56/0025; H04W 28/0215; H04W 72/12; H04W 28/12; H04W 28/26; H04W 72/14; H04W 72/1242; H04W 28/08; H04W 48/14; H04W 48/16; H04W 68/02; H04W 72/1263; H04W 36/30; H04W 74/04; H04W 8/082; H04L 5/0051; H04L 5/0064; H04L 12/805; H04L 1/0007; H04L 5/0057; H04L 47/365; H04L 5/0055; H04L 27/26; H04L 27/2666; H04L 27/2665; H04L 27/2607; H04L 27/2656; H04L 5/0048
See application file for complete search history.

(56) References Cited

U.S. PATENT DOCUMENTS

| | | | | |
|---|---|---|---|---|
| 2014/0169335 | A1* | 6/2014 | Franklin | H04W 8/082 370/332 |
| 2015/0023319 | A1 | 1/2015 | Park et al. | |
| 2016/0183299 | A1* | 6/2016 | Fang | H04W 72/042 370/329 |
| 2017/0026938 | A1 | 1/2017 | Onggosanusi et al. | |
| 2017/0150496 | A1 | 5/2017 | Xu et al. | |
| 2017/0290026 | A1* | 10/2017 | Li | H04W 72/04 |
| 2017/0331577 | A1 | 11/2017 | Parkvall et al. | |
| 2018/0115990 | A1* | 4/2018 | Abedini | H04L 5/0053 |
| 2018/0249374 | A1* | 8/2018 | Park | H04W 48/16 |
| 2018/0279286 | A1* | 9/2018 | Akoum | H04W 72/046 |
| 2018/0332491 | A1* | 11/2018 | Eckardt | H04W 28/0215 |
| 2018/0367985 | A1* | 12/2018 | Novlan | H04W 8/22 |

FOREIGN PATENT DOCUMENTS

| | | |
|---|---|---|
| CN | 102821426 A | 12/2012 |
| CN | 104619027 A | 5/2015 |
| CN | 105992347 A | 10/2016 |
| CN | 106034345 A | 10/2016 |
| CN | 106793135 A | 5/2017 |
| EP | 3065491 A1 | 9/2016 |
| WO | 2016013351 A1 | 1/2016 |
| WO | 2016122231 A1 | 8/2016 |
| WO | 2017034247 A1 | 3/2017 |
| WO | 2017127126 A1 | 7/2017 |
| WO | 2017136732 A1 | 8/2017 |

OTHER PUBLICATIONS

NTT Docomo: "Discussion on Initial Access Design for NR", 3GPP Draft; R1-1610073, Discussion on Initial Access Design for NR Final, 3rd Generation Partnership Project (3GPP), Mobile Competence Centre; 650, Route Des Lucioles ; F-06921 Sophia-Antipolis Cedex vol. RAN WG1, No. Lisbon, Portugal; Oct. 10, 2016-Oct. 14, 2016, Oct. 9, 2016 (Oct. 9, 2016), XP051150098, 7 Pages, Retrieved from the Internet: URL: http://www.3gpp.org/ftp/Meetings_3GPP_SYNC/RAN1/Docs/ [retrieved on Oct. 9, 2016].

NTT Docomo et al: "Discussion on a New UE Behavior to Receive PDSCH Containing RBs with PSS/SSS/PBCH", 3GPP Draft; R1-157443 Discussion on New UE Behavior to Receive PDSCH in RBS with PSSSSS_FINAL, 3rd Generation Partnership Project (3GPP), Mobile Competence Centre; 650, Route Des Lucioles; F-06921 S, vol. RAN WG1, No. Anaheim, USA; Nov. 11, 2015-Nov. 22, 2015, Nov. 15, 2015 (Nov. 15, 2015), XP051003586, 4 pages, Retrieved from the Internet: URL: http://www.3gpp.org/ftp/Meetings_3GPP SYNC/RAN1/Docs/ [retrieved on Nov. 15, 2015].

Huawei: "Introduction of Rel-14 NB-IoT Enhancements", R2-1702192, Revision of: R2-1702147, 36300_CR0971R2_(Rel-14), 3GPP TSG-97 Meeting #97, Athens, Greece, Feb. 13-17, 2017, 20170224, 22 Pages.

Mediatek Inc: "Considerations for Synchronization Signals Design in NR Beamformed Initial Access", 3GPP TSG RAN WG1 Meeting #85, R1-167526, Gothenburg, Sweden, Aug. 22, 2016-Aug. 6, 2016, 6 Pages, Aug. 22, 2016.

\* cited by examiner

SYNCHRONIZATION SIGNAL TRANSMISSION FOR MOBILITY

CROSS-REFERENCE TO RELATED APPLICATIONS

This application is a continuation of U.S. patent Ser. No. 16/027,050, filed Jul. 3, 2018, which claims priority to U.S. Provisional Application Ser. No. 62/531,289, filed on Jul. 11, 2017, which is hereby assigned to the assignee hereof and hereby expressly incorporated by reference herein in their entireties as if fully set forth below and for all applicable purposes.

INTRODUCTION

Certain aspects of the present disclosure relate to communication systems, and more particularly, a synchronization signal (SS) which may be used to facilitate mobility. In certain aspects, the SS may be a UE-specific SS. In any case, the SS may be transmitted by a serving and/or target BS and received by a UE on configured UE-specific resources. Additionally, in certain aspects, UE-specific RACH resources are used for mobility.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication that may be performed, for example, by a BS. The method generally includes assigning at least one user equipment (UE)-specific configuration, wherein the UE-specific configuration comprises an allocation of resources for a synchronization signal (SS) for mobility, and communicating with the UE based, at least in part, on the UE-specific configuration.

Certain aspects of the present disclosure provide an apparatus for wireless communication that may be performed, for example, by a BS. The apparatus generally includes means for assigning at least one user equipment (UE)-specific configuration, wherein the UE-specific configuration comprises an allocation of resources for a synchronization signal (SS) for mobility, and means for communicating with the UE based, at least in part, on the UE-specific configuration.

Certain aspects of the present disclosure provide an apparatus for wireless communication that may be performed, for example, by a BS. The apparatus generally includes at least one processor and a memory coupled to the at least one processor. The at least one processor is configured to assign at least one user equipment (UE)-specific configuration, wherein the UE-specific configuration comprises an allocation of resources for a synchronization signal (SS) for mobility, and communicate with the UE based, at least in part, on the UE-specific configuration.

Certain aspects of the present disclosure provide a computer readable medium storing computer executable instructions thereon for causing a BS to assign at least one user equipment (UE)-specific configuration, wherein the UE-specific configuration comprises an allocation of resources for a synchronization signal (SS) for mobility, and communicate with the UE based, at least in part, on the UE-specific configuration.

Certain aspects of the present disclosure provide a method for wireless communication that may be performed, for example, by a UE. The method generally includes receiving an assignment of at least one UE-specific configuration, wherein the UE-specific configuration comprises an allocation of resources for a synchronization signal (SS) for mobility, and communicating with a BS based, at least in part, on the UE-specific configuration.

Certain aspects of the present disclosure provide an apparatus for wireless communication that may be performed, for example, by a UE. The apparatus generally includes means for receiving an assignment of at least one UE-specific configuration, wherein the UE-specific configuration comprises an allocation of resources for a synchronization signal (SS) for mobility, and means for communicating with a BS based, at least in part, on the UE-specific configuration.

Certain aspects of the present disclosure provide an apparatus for wireless communication that may be performed, for example, by a UE. The apparatus generally includes at least one processor and a memory coupled to the at least one processor. The at least one processor is configured to receive an assignment of at least one UE-specific configuration, wherein the UE-specific configuration comprises an allocation of resources for a synchronization signal (SS) for mobility, and communicate with a BS based, at least in part, on the UE-specific configuration.

Certain aspects of the present disclosure provide a computer readable medium storing computer executable instructions for causing a UE to receive an assignment of at least one UE-specific configuration, wherein the UE-specific configuration comprises an allocation of resources for a synchronization signal (SS) for mobility, and communicate with a BS based, at least in part, on the UE-specific configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
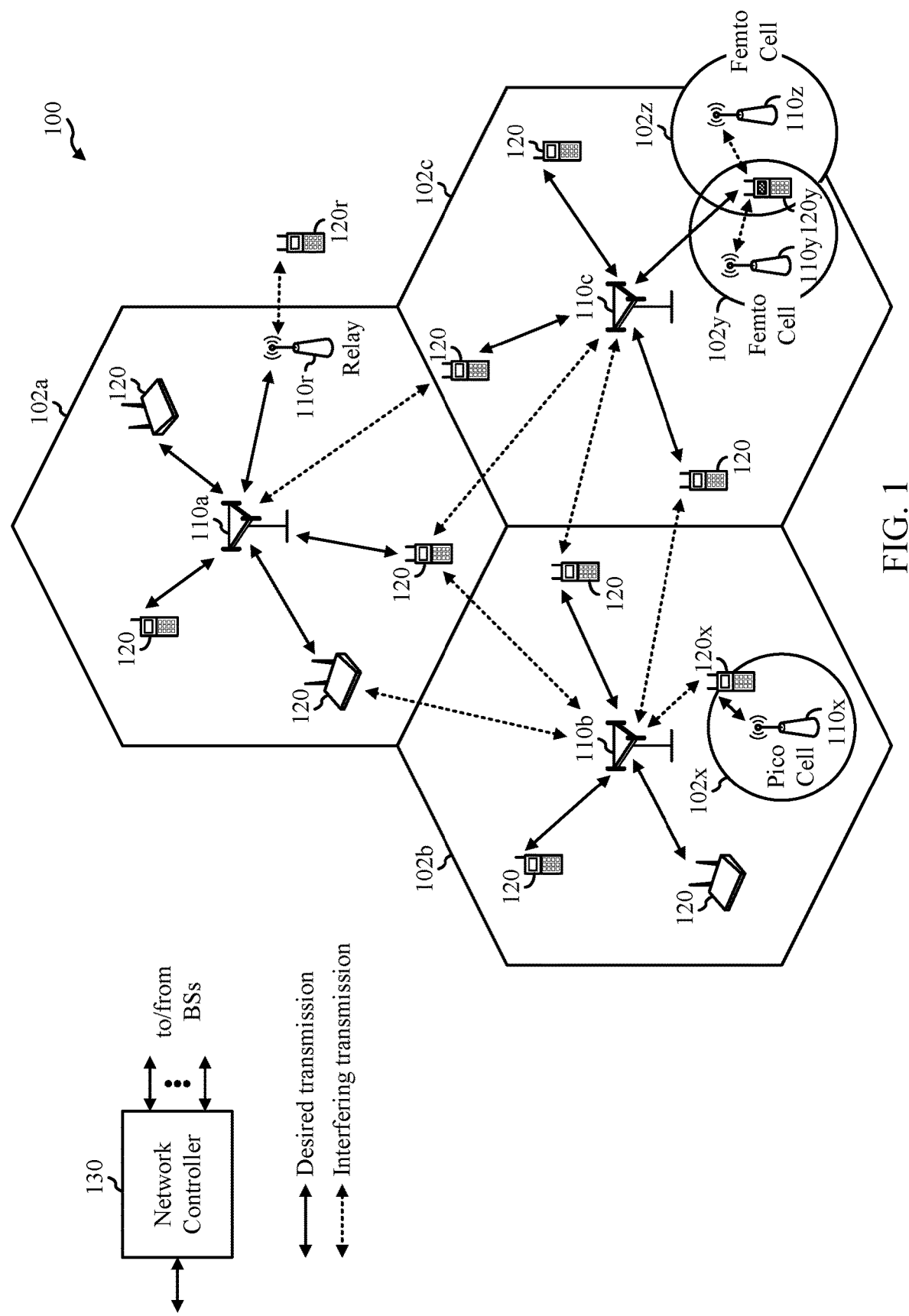
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

mmW communications bring gigabit speeds to cellular networks, due to availability of large amounts of bandwidth. The unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

Spectrum bands in high frequencies (e.g., 28 GHz, may be referred to as mmW (or mmWave)) provide large bandwidths capable of delivering multi-Gbps data rates, as well as extremely dense spatial reuse which may increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies in which mmW operate, small wavelengths enable a large number of antenna elements in a relatively small form factor. Unlike microwave links, which may cast very wide footprints, reducing the achievable amount of reuse of the same spectrum within a geographical area, mmW links cast very narrow beams (for example, beams may have a narrow angle). This characteristic of mmW may be leveraged to form directional beams that may send and receive more energy to overcome propagation and path loss challenges.

These narrow directional beams can also be utilized for spatial reuse. This is one of the key enablers for utilizing mmW for mobile broadband services. In addition, the non-line-of-site (NLOS) paths (e.g., reflections from nearby building) can have very large energies, providing alternative paths when line-of-site (LOS) paths are blocked.

In a beamformed wireless communication system, a wireless device may transmit and receive using directional beams. A UE may receive, from a BS one or more downlink signals. The UE may receive the downlink signals using one or more receive beams at the UE.

Certain aspects of the present disclosure generally relate to methods and apparatus for a SS which may be used to facilitate mobility. The SS is transmitted using a UE-specific configuration of time/frequency resources. In certain aspects, the SS may be a UE-specific SS, wherein the SS is specific to one or a group of UE. In certain aspects, the SS may be transmitted using a UE-specific allocation of resources. In this manner, an SS, which is not cell-specific is transmitted by serving and/or target BSs and used for mobility purposes. In certain aspects, UE-specific RACH resources are used for mobility.

As described herein, a BS may transmit an indication of SS resources that may be used for an SS, UE-specific SS, and/or UE-specific RACH. In certain scenarios, a BS serving the UE may transmit an indication of the UE-specific resources used by the serving BS and the UE specific resources used by a non-serving, target BS. The serving BS may transmit an indication of UE-specific RACH resources the UE may use in a RACH procedure with the target BS. As described herein, mobility may refer handover. Mobility may refer to L3 mobility, wherein a UE maintains at least one internet protocol (IP) session while moving from a serving BS to a target BS. Aspects described herein may be used for connected mode L3 mobility, wherein the UE has an active RRC connection with a BS.

Aspects of the present disclosure provide techniques and apparatus for using a UE-specific or group of UE-specific SS blocks for connected mode handover. As described herein, a BS may transmit the UE-specific SS signal (or UE-specific SS block). The SS or SS block may be UE-specific or specific to a group of UEs. According to aspects, a BS may also transmit an allocation of UE-specific contention-free RACH resources for a connected mode handover. According to an example, the allocation of UE-specific contention-free RACH resources may be UE-specific or specific to a group of UEs. As described in more detail herein, the UE-specific contention-free RACH resources may be based, at least in part, on the UE-specific SS. The UE-specific SS and UE-specific contention-free RACH resources may be aperiodic.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio (NR) or 5G network.

Aspects of the present disclosure relate to a BS conveying an allocation of UE-specific SS or group of UE-specific SS for mobility in a connected mode. Mobility may refer to hand over from a serving BS to target BS. As an example, mobility may refer to a connected mode hand over where a UE maintains at least one active IP session during the hand over. According to an example, the BS may also transmit an allocation of UE-specific contention-free RACH resources. In one example, the UE-specific SS and UE-specific RACH resources may be aperiodic.

According to aspects, a BS may assign at least one UE-specific configuration. The UE-specific configuration comprises an allocation of resources for an SS. The BS may communicate with the UE based, at least in part, on the UE-specific configuration. In one aspect, the BS may communicate with a BS serving the UE. The BS serving the UE may transmit an indication of the allocation of resources to the UE.

Correspondingly, a UE may receive an assignment of at least one UE-specific configuration, wherein the UE-specific configuration comprises an allocation of resources for an SS. A UE may communicate with a BS based, at least in part, on the UE-specific configuration.

UEs 120 may be configured to perform the operations 1200 and other methods described herein and discussed in more detail below associated with UE-specific SS communication. Base station (BS) 110 may comprise a transmission reception point (TRP), Node B (NB), 5G NB, access point (AP), new radio (NR) BS, gNB, etc.). The NR network 100 may include the central unit. The BS 110 may perform the operations 1100 and other methods described herein.

A BS 110*a* may be a serving BS for the UE 120. A non-serving or target BS 110*b* or 110*c* may communicate with a BS 110*a*. As an example, the non-serving or target BS may exchange scheduling information, BS or UE 120 capability information, or configuration information associated with an SS (which may be a UE-specific SS) or UE-specific RACH resources.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
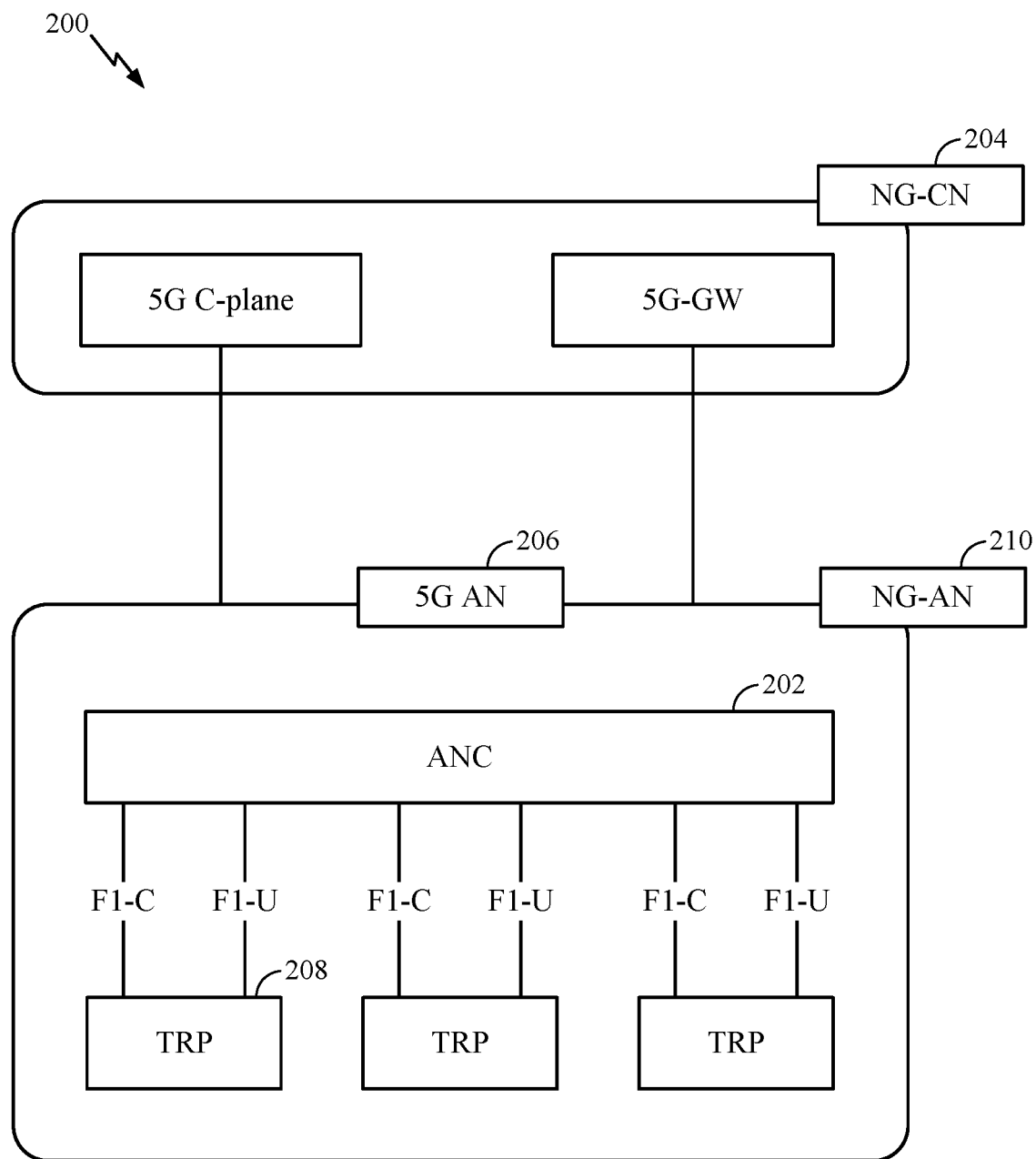
FIG. 2 is a block diagram illustrating an example logical architecture of a distributed RAN, in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
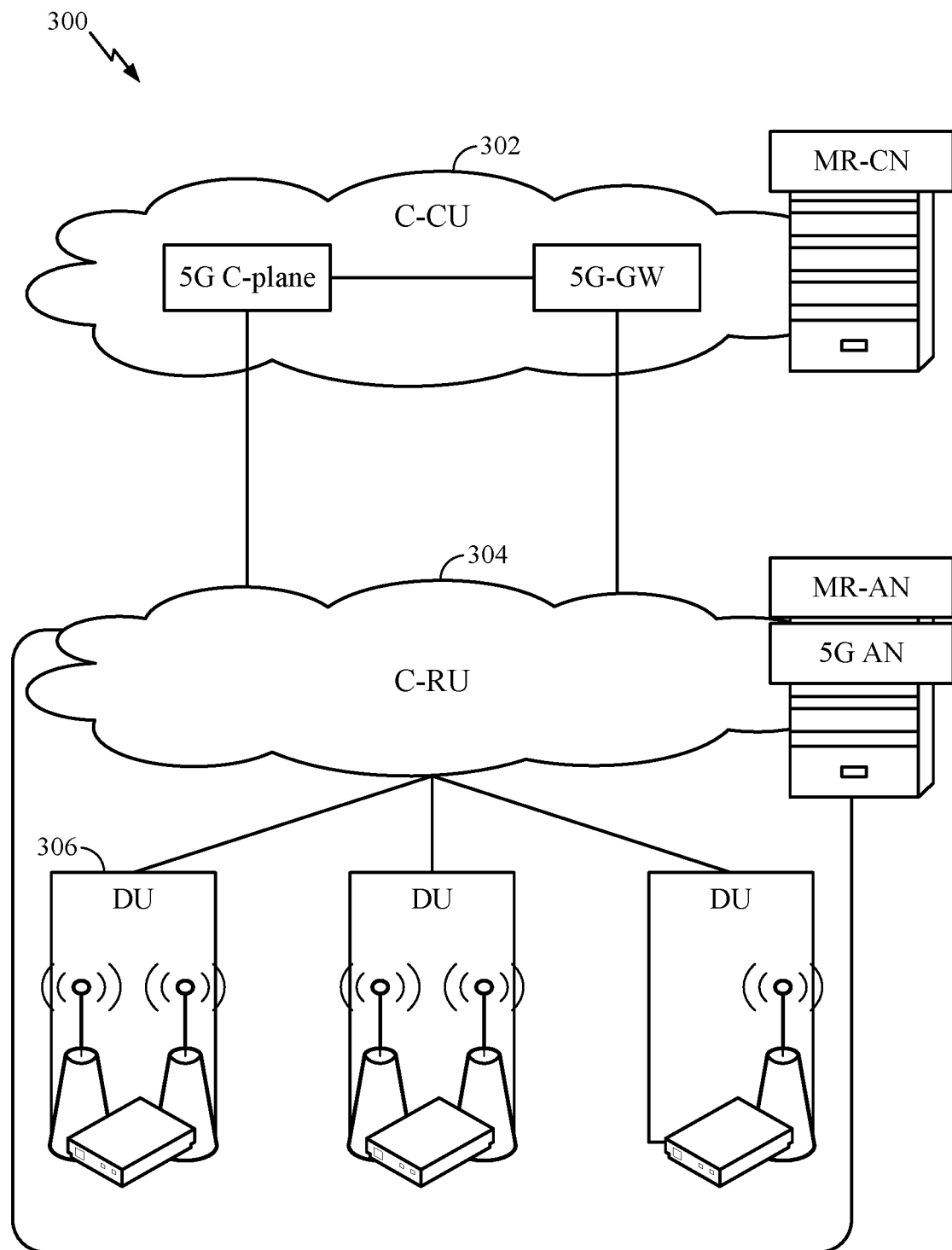
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
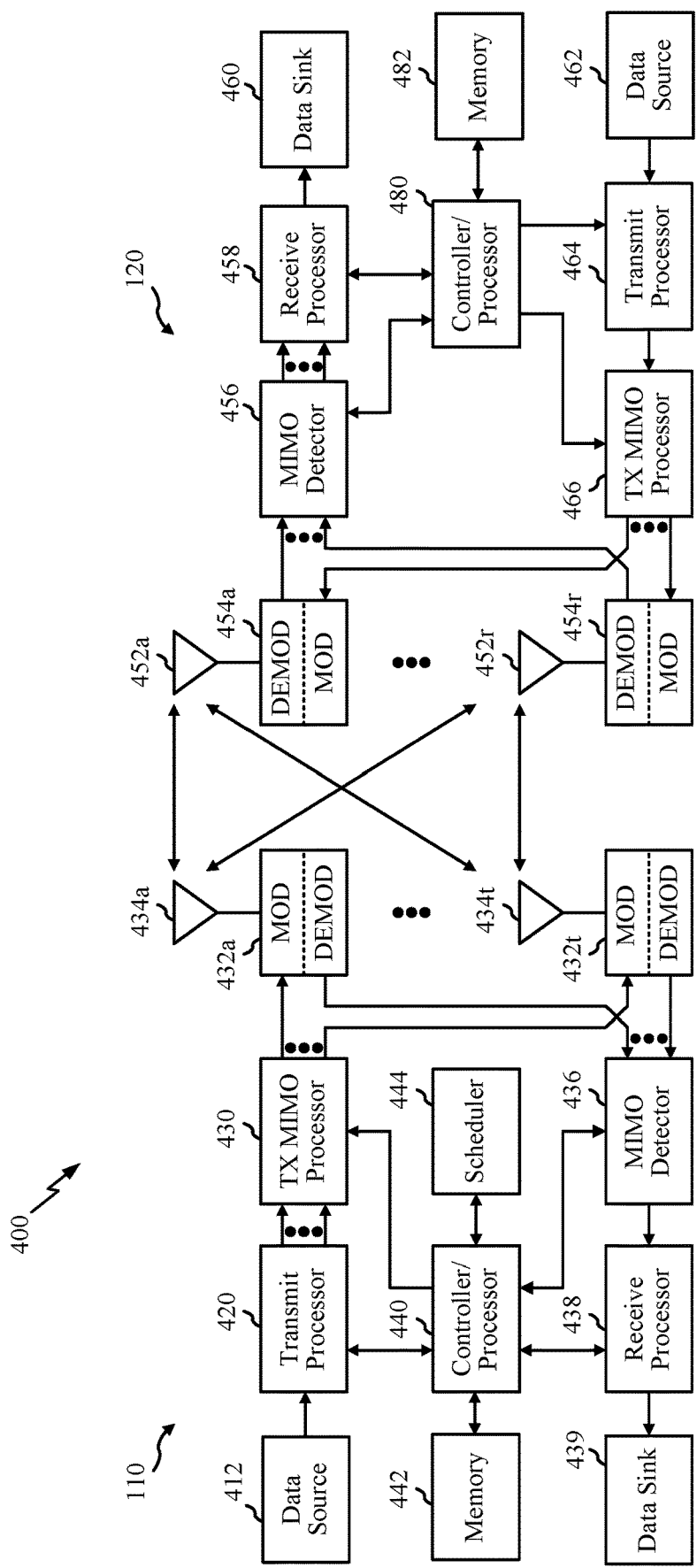
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure including the operations 900 and 1000 illustrated in FIGS. 9 and 10. For example, antennas 452, Tx/Rx 454, processors 466, 458, 464, and/or controller/processor 480 of the UE 120 and/or antennas 434, Tx/RX 432, processors 430, 420, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9, and/or other processes for the techniques described herein. The processor 480 and/or other processors and modules at the UE 120 may also perform or direct, e.g., the execution of the functional blocks illustrated in FIG. 10, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
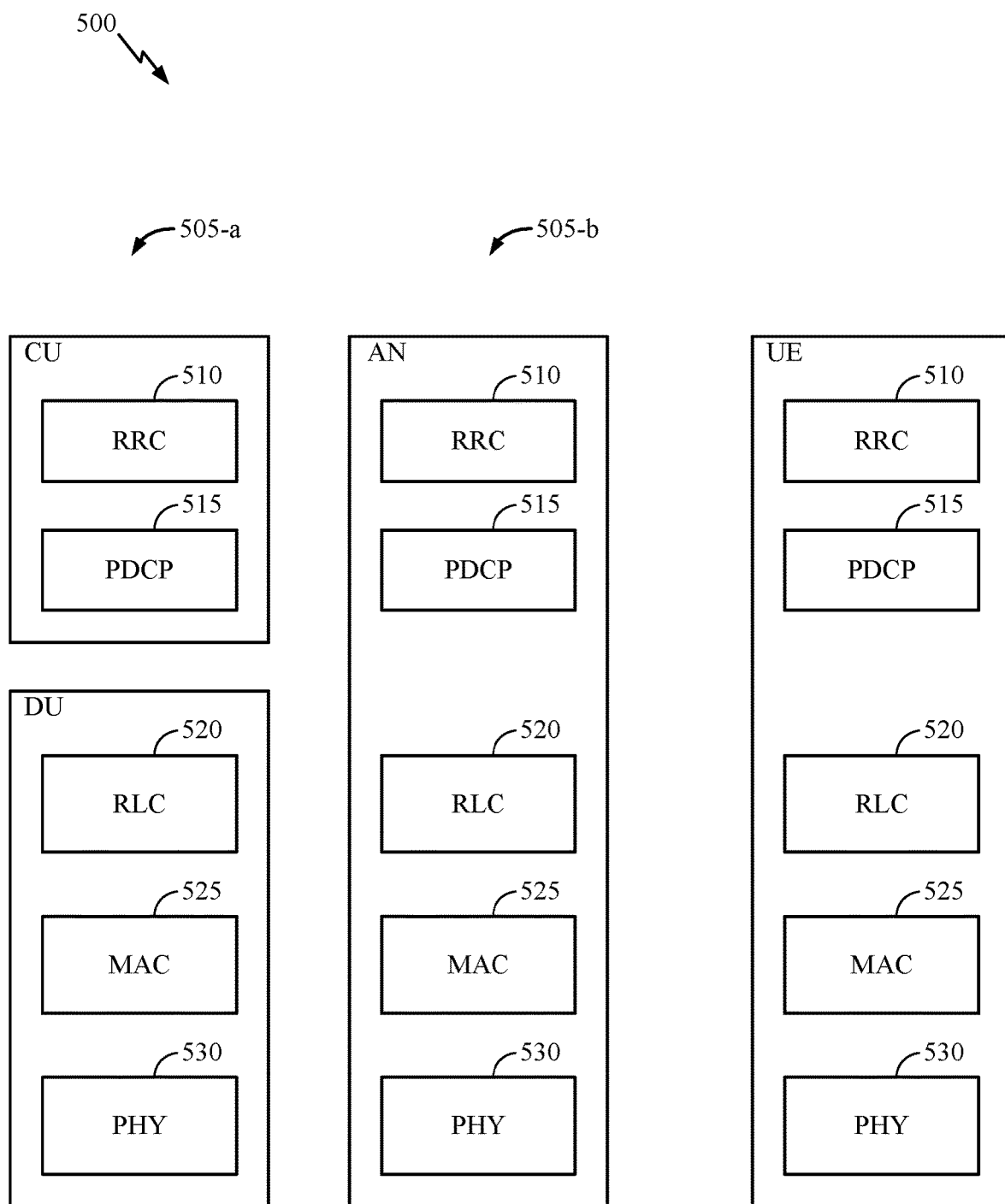
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
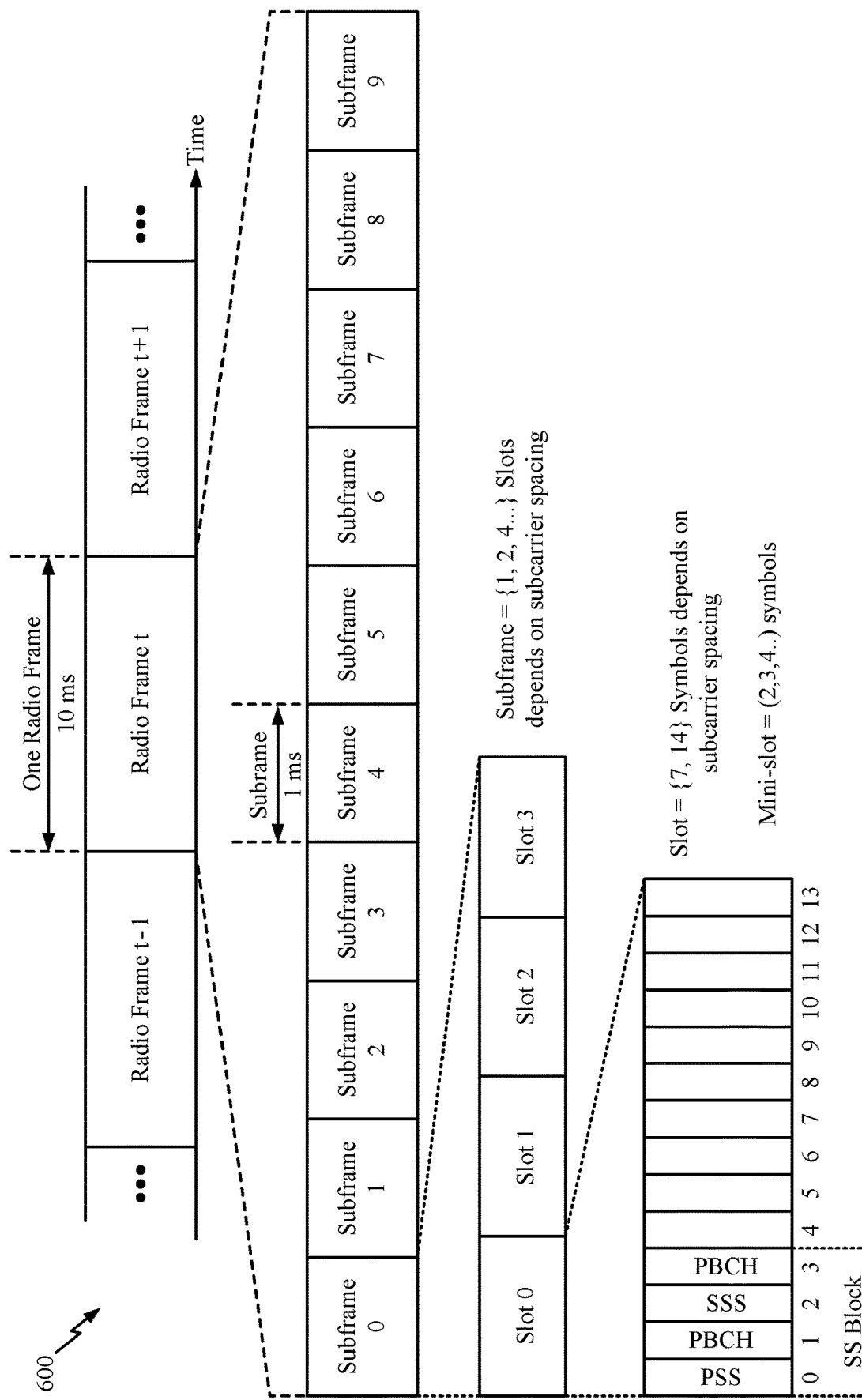
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols). A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example SS Transmission

In some wireless systems, such as LTE, mobility is based on an SS transmitted from one or more BSs. The SS signals (or SS blocks) are periodic and cell-specific. Additionally, RACH resources are tied to the SS. RACH resources, similar to SS resources, may also be cell-specific and periodic.

In NR, however, connected mode L3 mobility is based on SS blocks, which may include, for example, a primary synchronization signal (PSS), secondary synchronization signal (SSS), demodulation reference signal (DRMS) for a physical broadcast channel (PBCH), and/or CSI-RS (if CSI-RS is configured). In NR, SSs are transmitted from multiple antenna ports may share the same time/frequency resources. For example, 8 antenna ports at a BS may transmit SSs in 8 different directions; however, within a single symbol, the SS may be located within the same set of tones. In NR, CSI-RS may occupy different time/frequency resources.

According to aspects of the present disclosure, a BS transmits a UE-specific configuration for an SS signal or SS block (or a group of UE-specific SS or SS blocks) for connected mode handover. UE-specific SS refers to SS transmitted in a direction of the UE. As an example, UE-specific SS may be transmitted using beam which are focused in a direction of the UE. Connected mode handover may refer to handover of a UE from a serving BS to a target BS, wherein the UE maintains at least one IP session during the handover.

In certain situations, the BS may also transmit an allocation for UE-specific contention-free RACH resources. In one example, the BS may transmit an allocation for a group of UEs, wherein the allocation of contention-free RACH resources is specific to the group of UEs. The SS blocks, which according to certain aspects, may be UE-specific, and RACH resources may be aperiodic.

As described herein, an SS block may include one or more of a PSS, SSS, PBCH, and/or DMRS of PBCH. As used herein, signaling (SS or RACH, which according to aspects may be UE-specific SS and/or UE-specific RACH) may refer to transmissions from a BS which are focused in the direction of the UE. As an example the BS may use more beams concentrated in a direction associated with the location of the UE.

According to aspects of the present disclosure a BS may use a same set of beams while transmitting UE-specific/group of UE-specific SS blocks and while receiving UE-specific/group of UE-specific contention free RACH resources. The set of beams may be different from the beams used for regular SS block transmissions/regular RACH reception. According to aspects, the UE selects the RACH resource and preamble from the UE-specific/group of UE-specific contention-free RACH resources based on a suitable SS block and transmits accordingly.

Figure 8:
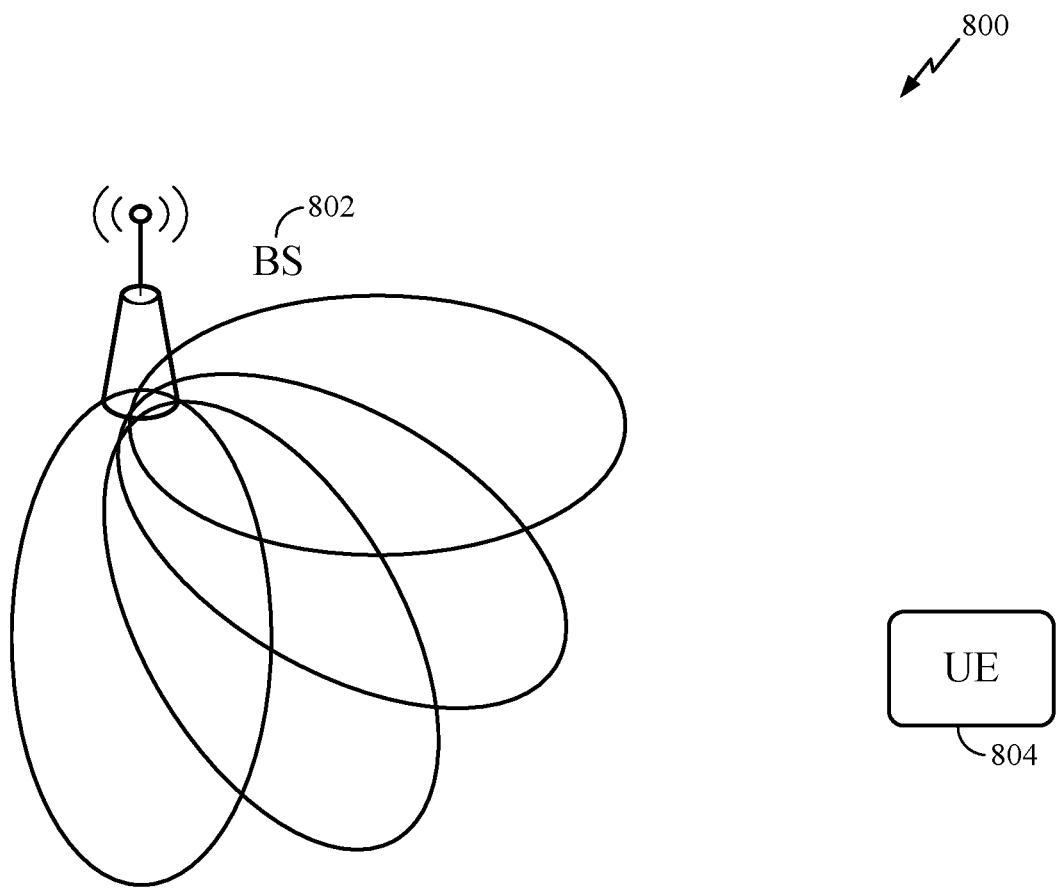
FIG. 8 illustrates example beamformed signaling, in accordance with certain aspects of the present disclosure.

As noted above, in some wireless systems, like LTE, a BS transmits a cell-specific SS. For example, the PSS and SSS may be transmitted every 5 ms and the PBCH may be transmitted every 10 ms. In NR, instead of transmitting a SS in one location of a 5 ms period, the BS may transmit multiple SSs in different directions (using different directional beams, for example, as illustrated in FIG. 8) within the 5 ms time period.

Figure 7:
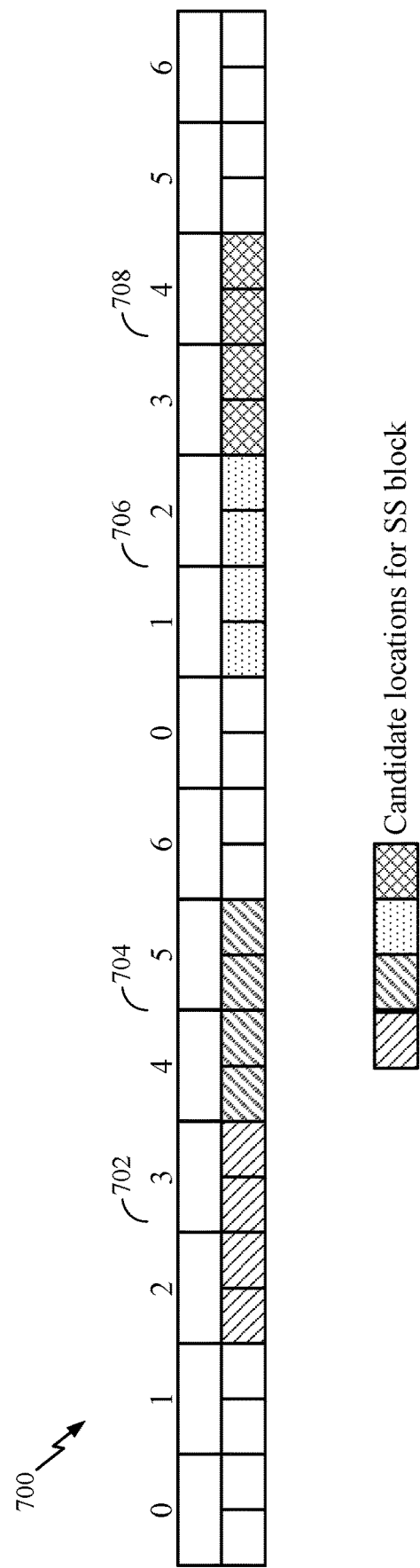
FIG. 7 illustrates an example SS block mapping.

FIG. 7 illustrates an SS block time pattern 700 that may be used for 30 kHz subcarrier spacing in NR. As shown at 700, a first slot may include 14 symbols (e.g., as illustrated in the second row at 700, which may be numbered 0-13). The mapping pattern preserves 4 symbols (symbols 0-3) for DL control at the beginning of the first slot of 14 symbols. This allows larger aggregation level for DL control for 15 kHz and 30 kHz subcarrier spacing and allows TDM multiplexing of at least one SS block within the LTE subframe.

The mapping 700 preserves 2 symbols at the end of the first slot of 14 symbols are for guard period and UL control for 30 kHz. The mapping preserves 2 symbols for DL control at the beginning of the second slot of 14 symbols, which may be used for DL control for 30 kHz. The mapping preserves 4 symbols at the end of the second slot of 14 symbols for guard period and UL control.

As illustrated at 702 and 704, two SS blocks may be mapped to the first slot of 14 symbols. The first location 702 may be at symbols 4-7. The second location 704 may be at symbols 8-11.

As illustrated at 706 and 708, two SS blocks may be mapped to the second slot of 14 symbols. At 706, the third location is at symbols 2-5. As 708, the fourth location is at symbols 6-9.

FIG. 8 illustrates an example 800 of a BS and UE in an NR system, in accordance with aspects of the present disclosure. As noted above, a BS may transmit signals in a cell-specific manner. The BS may attempt to cover most (or all) directions of the cell, such that a UE may receive a transmitted signal, irrespective of its location within the cell. The BS may receive RACH signals from different areas of the cell. The BS 802 and the UE 804 may communicate using beamformed communication, wherein signals are transmitted and received using directional beams. A beam may be associated with one or more (beamformed) antenna ports.

The BS 802 may transmit using various transmit beam directions, in an effort to cover all directions of the cell. A UE 804 located in the cell may thus receive a signal transmitted by the BS 804, regardless of the location of the UE within the cell.

In one example, the BS 802 may typically transmit in 64 directions covering all possible angles in azimuth and elevation. In other words, the BS may cover 120 degrees in azimuth and 30 degrees around the horizontal line in elevation. The BS may split this area into equal angular portions (regions) and transmit a beam in each of these portions. If a BS has some idea of where a UE is located in a cell, the BS may transmit more SS signals (SS blocks) towards the UE's location. In this manner, the SS signaling may be UE-specific or specific to a group of UEs. By transmitting more signaling in the direction of a UE, the BS may achieve greater beamforming gains in that direction.

According to one example, initially, a non-serving, target BS may transmit a cell-specific SS or beam refinement signal (BRS). A UE may detect the cell-specific SS or BRS transmitted by this non-serving BS. The UE may report to its serving BS detection of this cell-specific SS or BRS and the direction of the target cell as seen by the UE.

The UE's serving BS may communicate with the target BS, indicating the UE's angular direction relative to the target BS. Thereafter, the target BS may transmit one or more SS signaling using a UE-specific configuration in the direction of the UE. This may allow the serving BS to better estimate the link gain from the SS transmitted by the target BS. According to aspects, the UE's serving BS may also transmit SS signaling using a UE-specific configuration.

The UE may receive the SS, transmitted us the UE-specific configuration, from the serving and target BS and may take signal quality measurements associated with the SS. According to aspects, the UE-specific configuration may include a time and/or frequency location of a SS block (SSB), SS signal, or SS burst, a periodicity of a SS signal used for mobility, locations of SSBs in the SS burst that need to be measured.

The UE may report the measurements to the serving BS. With this information, the serving BS may decide to handover the UE to the target cell. Alternatively, if the link quality of the target cell is not better (or does not exceed the link quality associated with serving BS by a threshold amount), the serving BS may decide not to handover the UE to the target BS.

If the UE is to be handed over to the target BS, the target BS may generate UE-specific RACH resources which correspond to UE-specific configuration used to transmit the SS block. Stated otherwise, the SS and UE-specific contention free RACH resources may be mapped to each other. The UE may select a preamble and use the UE-specific RACH resources to access and connect to the target BS. In an example, UE-specific configuration for the RACH procedure indicates beams that the BS may use to receive a RACH preamble transmitted by the UE. Additionally or alternatively, the UE-specific configuration for the RACH procedure indicates the RACH occasions (time and frequency resources) for the RACH procedure.

According to another example, a connected mode UE receives SS blocks transmitted using a UE-specific configuration from its serving BS. To trigger transmission of SS from a target BS, the UE may detect the presence of the target BS and may report the link quality and associated transmit beams of target BS. This may occur based on the SS from the target BS or BRS.

The UE may measure the signal strength associated with the SS from the serving BS and the target BS. This information may be used to compare link quality associated with both cells. If the UE has strong link quality with the target BS, the UE's serving BS may inform the target BS to transmit a UE-specific SS to the UE.

Furthermore, to speed up handover, the target BS may assign UE-specific contention-free RACH resource to the UE. The assignment may be communicated to the UE via the UE's serving B S. According to aspects, the target BS may indicate the receive beam directions the target BS may use during a RACH procedure with the UE. The serving BS may communicate the receive beam directions to the UE.

Notably, UE-specific contention-free RACH resources may use a different receive beam as compared to receive beams used in a typical RACH procedure. This is, in part, because the target BS has some information associated with the UE's location. Accordingly, the target BS may create more receive beams in the direction of the UE. The UE may receive an indication of the receive beam used by the BS during the RACH procedure.

According to aspects, the target BS may convert or repurpose a subframe typically used for data transmission.

For example, a subframe typically used for data may be used for contention-free RACH. In this manner, the UE-specific RACH may be aperiodic.

According to aspects, the SS transmitted using a UE-specific configuration may be transmitted in a subframe typically reserved for data transmissions. The SS may not need to be transmitted in locations used for cell-specific SS transmissions.

According to aspects, the allocation of UE-specific time/frequency resources of the SS transmitted by the target BS may be selected such that the SS from the target BS does not collide with the SS from a serving BS. The serving and target BS may exchange information regarding communication schedules, UE capability, and BS capability, in an effort to avoid collisions. According to one example, signals from a serving BS and target BS may be received by the UE using different subarrays at the UE. Depending on a UE's capability, the UE may not be able activate multiple subarrays simultaneously. If, for example, the UE has only one subarray or one receive chain, it may not be able to simultaneously receive transmissions from both the serving BS and a target BS. If the UE has multiple subarrays, it may be able to simultaneously receive a SS from a target BS while receiving data from a serving BS.

According to aspects, a target BS may generate a UE-specific RACH resources which correspond to a SS block. Stated otherwise, the SS, transmitted using a UE-specific configuration, and the UE-specific RACH are mapped to each other. A UE-specific RACH may refer to a BS generating more RACH beams in the angular region of the UE, in an effort to receive a RACH preamble from the UE. The BS may achieve better beamforming gains while receiving RACH signaling when the BS generates more RACH beams in the direction of the UE.

Figure 9:
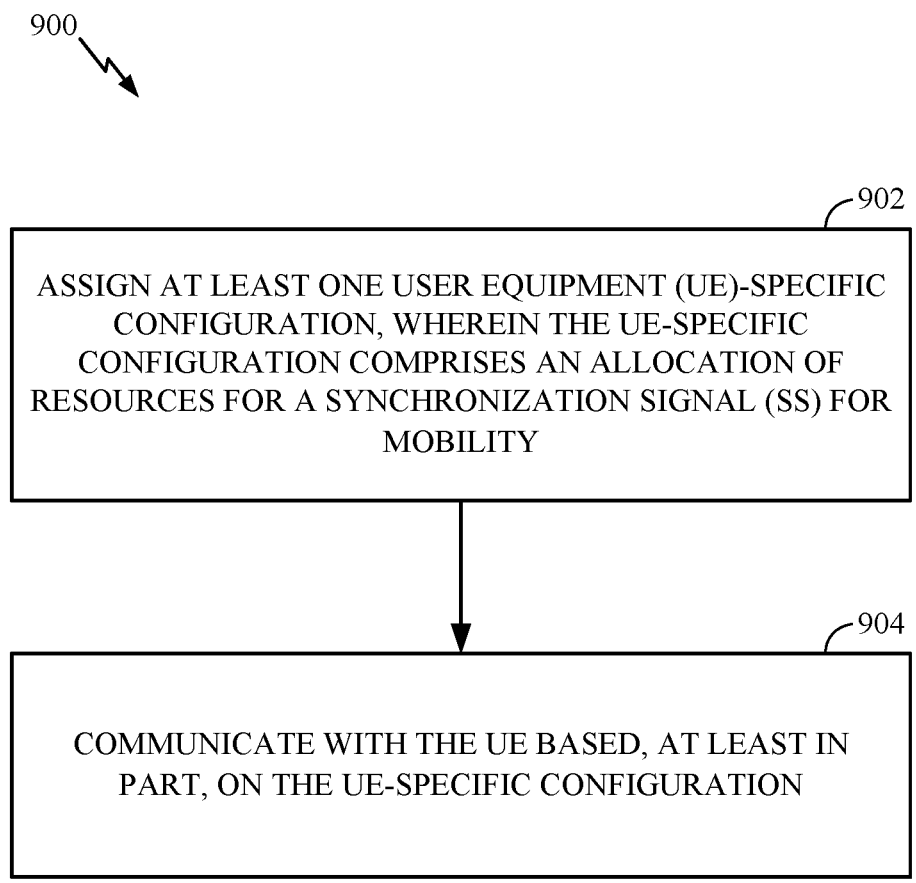
FIG. 9 illustrates example operations performed by a BS, in accordance with certain aspects of the present disclosure.

FIG. 9 illustrates example operations 900 which may be performed by a BS, in accordance with aspects of the present disclosure. The BS may include one or more components illustrated in FIG. 4.

At 902, the BS may assign at least one UE-specific configuration, wherein the UE-specific configuration comprises an allocation of resources for an SS which may be used for mobility. According to aspects, the SS may be a UE-specific SS. At 904, the BS may communicate with the UE based, at least in part, on the UE-specific configuration.

Figure 10:
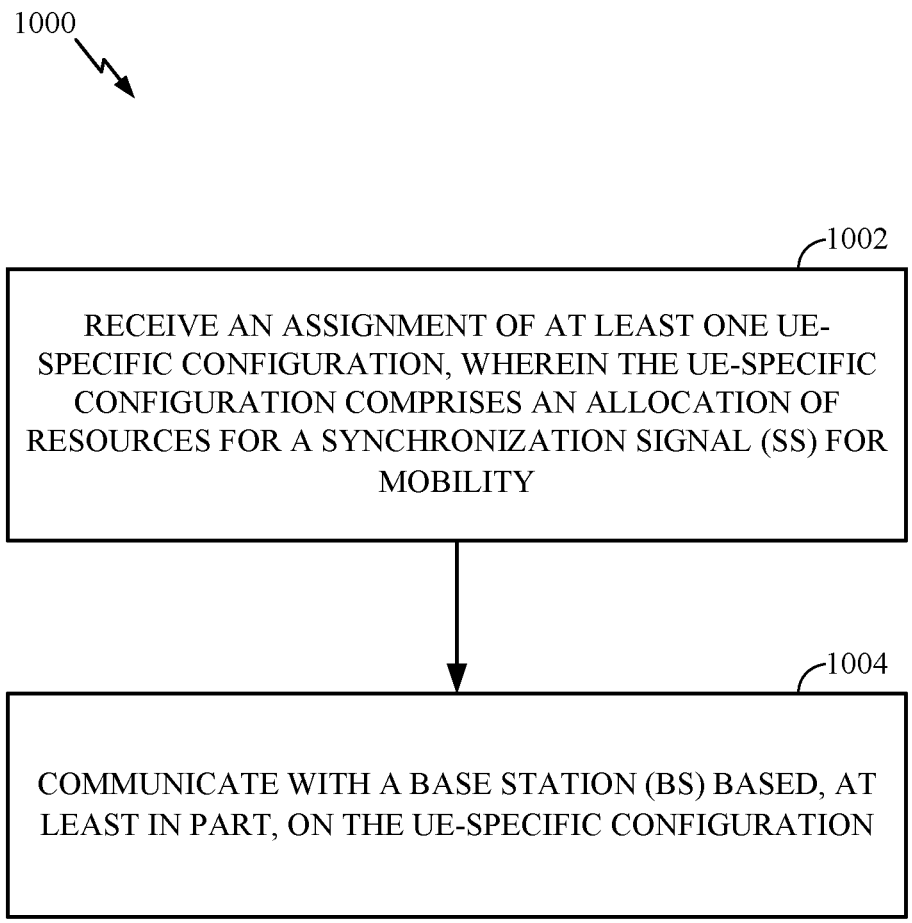
FIG. 10 illustrates example operation performed by a UE, in accordance with certain aspects of the present disclosure.

FIG. 10 illustrates example operations 1000 which may be performed by a UE, in accordance with aspects of the present disclosure. The UE may include one or more components illustrated in FIG. 4.

At 1002, the UE may receive an assignment of at least one UE-specific configuration, wherein the UE-specific configuration comprises an allocation of resources for an SS which may be used for mobility. As noted above, according to aspects, the SS may be a UE-specific SS. At 1004, the UE may communicate with a BS based, at least in part, on the UE-specific configuration.

In one example, the target BS may transmit the UE-specific configuration to the UE's serving BS. The BS serving the UE may transmit the UE-specific configuration to the UE. According to an aspect, a network entity may configure or transmit the UE-specific configuration to one or both of the serving BS and a target BS.

The configuration may include resources used by the BS to transmit the SS. As described above, in certain situations, both a serving BS and a target BS may transmit SSs on UE-specific resources. The BS serving the UE may transmit an indication of the SS transmitted by the serving BS and an indication of the SS transmitted by target BS.

The UE-specific configuration associated with the SS may include one or more parameters described herein. For example, the configuration may indicate the time/frequency resources used for transmitting the SS. The configuration may include an indication of a transmit beam sweeping pattern used by the BS to transmit the SS. The configuration may include a composition of a SS block used to transmit the SS. Thus, the configuration may indicate the constituent signals within the SS block and their relative location in time/frequency. As an example, the configuration may indicate if a Physical Broadcast Channel (PBCH) is transmitted with the SS and/or a content of the PBCH.

The configuration may include number of SS bursts (e.g., burst sets) transmitted by a BS. NR, an SS burst set may include a number of SS blocks wherein the SS blocks of the burst may be transmitted in different directions. The configuration may include the relative location in time and frequency of the SS block. For example, in LTE, the PSS/SSS may arrive at the beginning of each 5 ms period; however, as described above, a data slot may be repurposed to transmit a SS using a UE-specific configuration.

An SS block may include the combination of PSS, SSS, tertiary synchronization signal (TSS), and PBCH. A BS may transmit SS blocks (in a burst set) in different directions (e.g., using beamformed transmissions). Assuming a SS burst set contains N SS blocks, the BS may transmit every $N^{th}$ SS block of the burst set (e.g., SS blocks having an index of 1, N+1, 2N+1, etc.) in a same direction.

The configuration may indicate the waveforms of signals transmitted with the SS signals or of the SS signals themselves. The waveforms may include at least one of a primary synchronization signal (PSS), secondary synchronization signal (SSS), tertiary synchronization signal (TSS), or a demodulation reference signal (DMRS) for a physical broadcast channel (PBCH). A TSS may be used to inform a UE of the timing within a 5 ms time period. As noted above, in LTE, the PSS/SSS is transmitted every 5 ms. In 5G, there may be up to 64 SS blocks every 5 ms. Accordingly, a UE may detect a PSS/SSS and not know the timing of a cell. The TSS may indicate the timing within a 5 ms period.

The configuration may indicate the content of a PBCH, such as how many bits are used for the PBCH transmission and what information is conveyed using those bits.

The configuration may indicate a numerology associated with the SS. The numerology may refer to tone spacing associated with the SS.

According to aspects, the SS is transmitted in a slot typically used for cell-specific SS transmission. According to another example, the SS is transmitted in a slot typically used for data transmission.

The UE-specific configuration may also include an assignment of UE-specific resources for a RACH procedure. The RACH procedure may be contention-based or contention-free. The UE may receive this configuration, select at least one RACH preamble based and perform a RACH procedure with a target BS based, at least in part, on the UE-specific resources for the RACH procedure. The resources for the RACH may be based on the UE-specific SS.

The configuration for the UE-specific RACH procedure may include one or more parameters. The configuration may include an indication of the time/frequency resources used for transmitting RACH signaling by the BS. The configuration for the RACH procedure may include at least one preamble or set of preambles assigned to the UE for the RACH procedure. The UE may select one of the preambles for the RACH procedure. The configuration may include a number of RACH preambles to be transmitted by the UE during the contention-free RACH procedure. The configuration may include an indication of receive beams used by the BS to receive a RACH preamble during the contention-free RACH procedure. The configuration may include a numerology (tone spacing) associated with the contention-free RACH procedure.

According to aspects, the UE may transmit RACH using cell-specific RACH time/frequency resources, even if the UE is assigned UE specific RACH resource. According to an example, A BS may provide a group of UE-specific RACH resource and allow contention-based RACH in those resources.

Contention-free RACH resources may be allocated to slot that is typically used for contention-based RACH procedures. According to aspects, a data slot is repurposed for UE-specific RACH procedures. For example, the BS and UE exchange RACH signaling in a slot typically used for data transmission.

The resources for SS or UE-specific RACH may be aperiodic.

According to aspects, a UE-specific configuration (for SS or for both SS and UE-specific RACH) may be based, at least in part on the BS's capability. The capability may be based on a BS's a beam correspondence capability. A beam correspondence capability refers to a BS's ability to map a BS transmit beam to a BS receive beam. Stated otherwise, with beam correspondence, a BS may use a same beam or a same set of beam to transmit a SS and receive RACH signaling from a UE.

The BS capability may be based on a radio frequency (RF) or digital processing capability, and/or a number of antenna ports at the BS. For example, if the BS has multiple antenna ports, it may allocate more time to transmit SS to the UE or receive RACH from the UE, as some of the antenna ports may be used to communicate with other UEs.

The BS capability may indicate whether a BS can communicate with other nodes (UEs or BSs) within a same slot (as the SS or UE-specific contention-free RACH).

According to aspects, the configuration is determined based on a communication schedule associated with the BS and at least one other BS or another UE. For example, resources for the SS or UE-specific contention-free RACH may be allocated in an effort to align or avoid overlapping with transmission to/from other BSs.

According to aspects, the UE-specific configuration is based, at least in part on a UE's capability. The capability may include a beam correspondence capability of the UE. If the UE has beam correspondence capabilities, the BS may reserve less resources for a UE's RACH transmission. If the UE does not have beam correspondence, the UE may not be able to map a receive beam used for UE-specific SS to a transmit beam used for RACH transmission.

The UE-specific configuration may be based on the RF capability, a number of antenna ports at the UE, or antenna configuration at the UE. A greater number of antenna ports may allow a UE to spend more time receiving SS or transmitting RACH. The configuration may be based on whether the UE may communicate with other nodes within the same slot while receiving SS or transmitting RACH.

The UE-specific configuration may be based on a communication schedule associated with the UE and another NB.

According to aspects, the configuration is specific to a group of UEs. As described herein, the UE-specific configuration may be used to facilitate handover and mobility, including L3 mobility. L3 mobility allows the UE to maintain at least one IP session during handover. L3 mobility may include idle mode L3 mobility (when the UE is in idle mode) or connected mode L3 mobility (when the UE is not in idle mode).

According to aspects, a BS (such as a target BS) may determine the UE-specific configuration based on a measurement report associated with a cell-specific signaling transmitted by target BS. For example, the target BS may transmit cell-specific SS. The UE may detect and measure the cell-specific SS. The UE may provide this information to its serving BS. The UE may also indicate, to the serving BS, the direction in which it receive the cell-specific SS. The serving BS may transmit this information to the target BS. In response, the target BS may determine the UE-specific configuration for the UE.

According to aspects, the target BS may receive from the BS serving the UE, a transmission schedule associated with the serving BS. The SS may be assigned based, at least in part, on the received transmission schedule. The UE-specific SS may avoid colliding with transmissions to/from the serving BS.

As described above, the serving BS may transmit a SS configuration to the UE. This may allow the UE to measure the SS transmitted by both the serving and target BS, in an effort to determine if the UE should handover. For example, the UE may measure both signals and transmit a measurement report. The serving BS may make mobility management decisions based, at least in part, on the received measurement report.

As described herein, SS may be used for mobility management in NR. In an example, a BS may use a same set of beams while transmitting the SS and receiving UE-specific contention-free RACH signaling from the UE.

Aspects of the present disclosure are described with respect to an SS used for mobility management purposes, wherein the SS is transmitted using UE-specific resources. In certain aspects, the SS is a UE-specific SS.

Figure 11:
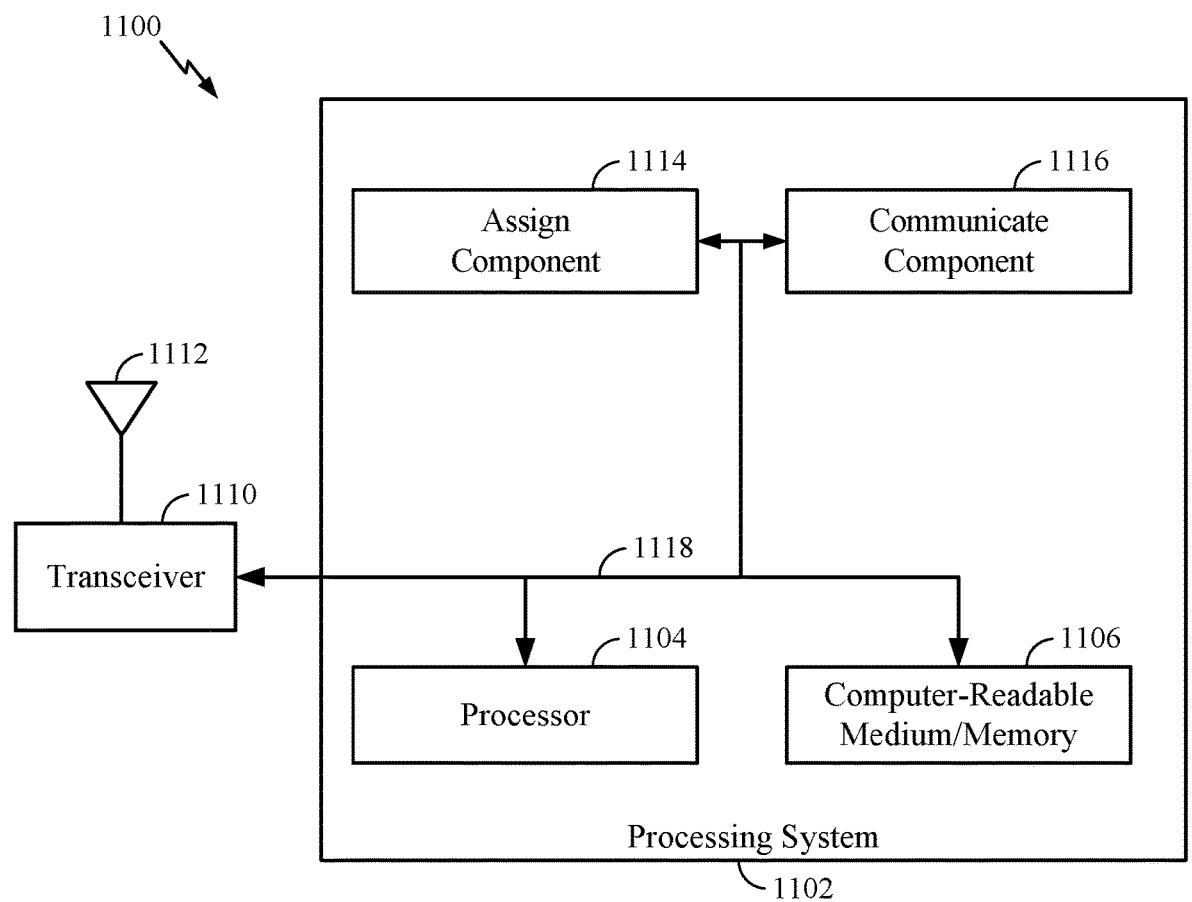
FIG. 11 illustrates a communications device that may include various components configured to perform operations for the techniques disclosed herein in accordance with aspects of the present disclosure.

FIG. 11 depicts a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1110. The transceiver 1110 is configured to transmit and receive signals for the communications device 1100 via an antenna 1112, such as the various signals described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1106 via a bus 1108. In certain aspects, the computer-readable medium/memory 1106 is configured to store computer-executable instructions that when executed by processor 1104, cause the processor 1104 to perform the operations illustrated in FIG. 9 or other operations for performing the various techniques discussed herein.

In certain aspects, the processing system 1102 further includes an assigning component 1114 and a communicating component 1116 for performing the operations illustrated in FIG. 9. In certain aspects, the communicating component 1116 may be part of the transceiver 1110. In certain aspects, the processing system 1102 includes one or more other non-illustrated components. The components 1114, 1116, and components configured to perform the operations describe herein may be coupled to the processor 1104 via bus 1108. In certain aspects, the components 1114 and 1116 (and other non-illustrated components) may be hardware circuits. In certain aspects, the components 1114 and 1116 (and other non-illustrated components) may be software components that are executed and run on processor 1104.

Figure 12:
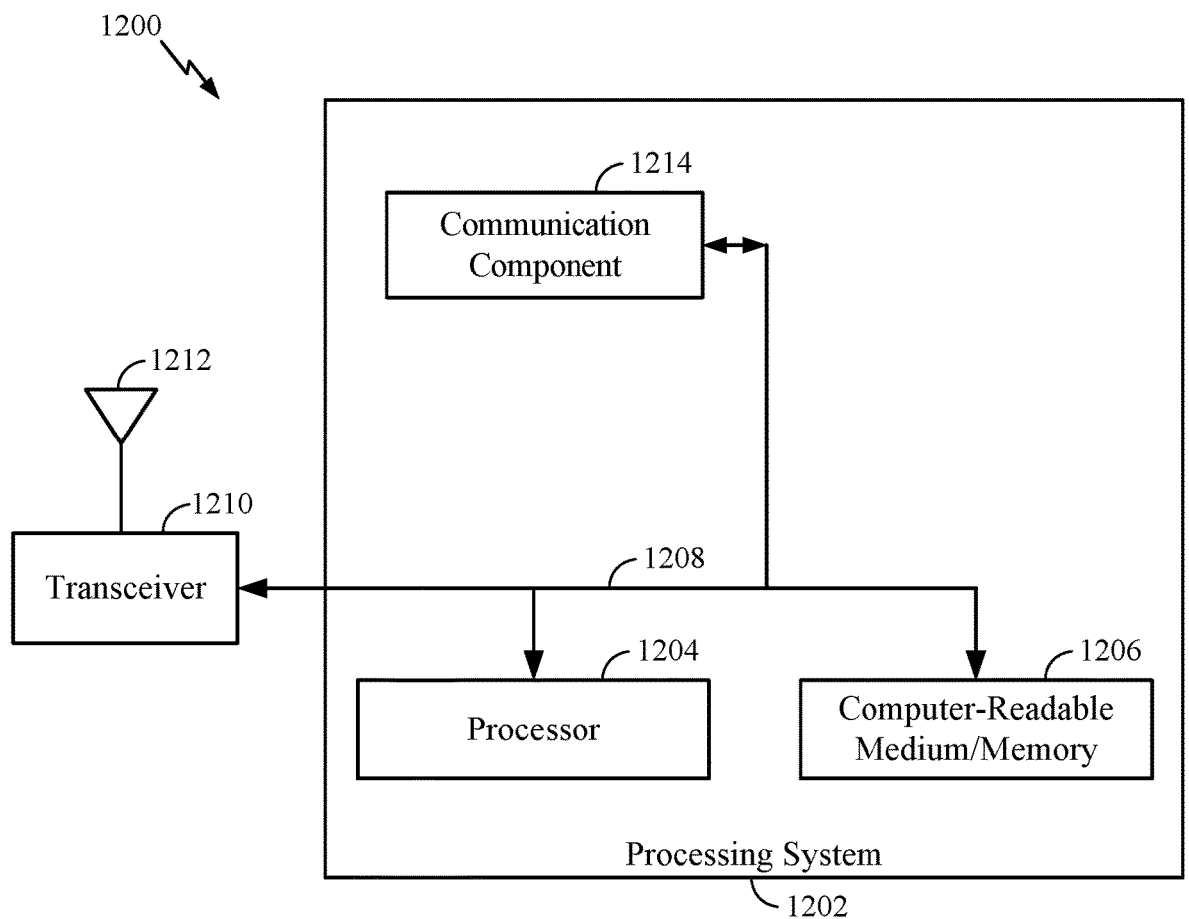
FIG. 12 illustrates a communications device that may include various components configured to perform operations for the techniques disclosed herein in accordance with aspects of the present disclosure.

FIG. 12 depicts a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1210. The transceiver 1210 is configured to transmit and receive signals for the communications device 1200 via an antenna 1212, such as the various signals described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1206 via a bus 1208. In certain aspects, the computer-readable medium/memory 1206 is configured to store computer-executable instructions that when executed by processor 1204, cause the processor 1204 to perform the operations illustrated in FIG. 10 or other operations for performing the various techniques discussed herein.

In certain aspects, the processing system 1202 further includes a communicating component 1214 for performing the operations illustrated in FIG. 9. In certain aspects, the communicating component 1214 may be part of the transceiver 11210. In certain aspects, the processing system 1202 includes one or more other non-illustrated components. The component 1214 and other optional components configured to perform the operations describe herein may be coupled to the processor 1204 via bus 1208. In certain aspects, the component 1214 (and other non-illustrated components) may be hardware circuits. In certain aspects, the component 1214 (and other non-illustrated components) may be software components that are executed and run on processor 1204.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a base station (BS), comprising:
    assigning at least one user equipment (UE)-specific configuration, wherein the at least one UE-specific configuration comprises:
    an allocation of UE-specific resources for at least one synchronization signal (SS) for mobility,
    an indication of a first SS of the at least one SS to be transmitted by a serving BS on the UE-specific resources and an indication of at least a second SS of the at least one SS to be transmitted by a target BS on the UE-specific resources, and
    a numerology associated with the first SS to be transmitted by the serving BS and a numerology associated with the second SS to be transmitted by the target BS; and
    communicating with the UE based, at least in part, on the UE-specific configuration.

2. The method of claim 1, wherein the at least one SS comprises a UE-specific SS.

3. The method of claim 2, where the UE-specific SS comprises an SS transmitted in a direction towards the UE.

4. The method of claim 1, wherein the configuration comprises locations of SS blocks transmitted in an SS burst set.

5. The method of claim 1, wherein the configuration comprises waveforms of signals transmitted with the at least one SS.

6. The method of claim 1, further comprising:
transmitting the UE-specific configuration to the serving BS of the UE, wherein the first BS comprises the target BS.

7. The method of claim 6, wherein the serving BS of the UE conveys the configuration to the UE through one or more of a handover message, a radio resource control (RRC) configuration, or a control channel.

8. The method of claim 1, wherein the configuration comprises at least one of: resources used for transmitting the at least one SS, an indication of: a transmit beam sweeping pattern used by the first BS to transmit the at least one SS, a composition of a SS block used to transmit the at least one SS, an indication of a Physical Broadcast Channel (PBCH) transmitted with the at least one SS, or a content of the PBCH.

9. The method of claim 1, wherein the configuration comprises a number of SS blocks transmitted in an SS burst set.

10. The method of claim 1, wherein assigning the at least one configuration further comprises:
assigning UE-specific resources for a random access (RACH) procedure.

11. The method of claim 10, further comprising:
receiving, from the UE, at least one RACH preamble based, at least in part, on the UE-specific resources for the RACH procedure.

12. The method of claim 10, wherein:
the RACH procedure comprises a contention-free RACH procedure, and
the UE-specific configuration for the contention-free RACH procedure comprises resources for transmitting RACH signaling by the first BS.

13. The method of claim 10, wherein the UE-specific configuration for the RACH procedure comprises at least one preamble assigned to the UE for the RACH procedure.

14. The method of claim 10, wherein the UE-specific configuration for the RACH procedure comprises a number of RACH preambles to be transmitted by the UE during the RACH procedure.

15. The method of claim 10, wherein the UE-specific configuration for the RACH procedure comprises an indication of beams that are associated with the first BS to receive a RACH preamble and occasion during the RACH procedure.

16. The method of claim 10, further comprising:
transmitting the UE-specific resources for the RACH procedure in a slot typically used for a contention-based RACH procedure.

17. The method of claim 1, wherein the UE-specific configuration is used for L3 mobility, wherein L3 mobility allows the UE to maintain at least one internet protocol (IP) session while moving from the serving BS of the UE to the first BS, and wherein the first BS comprises the target BS.

18. The method of claim 17, wherein L3 mobility comprises connected mode L3 mobility.

19. A method for wireless communication by a user equipment (UE) comprising:
receiving an assignment of at least one UE-specific configuration, wherein the at least one UE-specific configuration comprises:
an allocation of UE-specific resources for at least one synchronization signal (SS) for mobility,
indication of a first SS of the at least one SS to be transmitted by a serving BS on the UE-specific resources and an indication of at least a second SS of the at least one SS to be transmitted by a target BS on the UE-specific resources, and
a numerology associated with the first SS to be transmitted by the serving BS and a numerology associated with the second SS to be transmitted by the target BS; and
communicating with a first BS based, at least in part, on the UE-specific configuration.

20. The method of claim 19, wherein the at least one SS comprises a UE-specific SS.

21. The method of claim 20, where the UE-specific SS comprises the SS transmitted in a direction towards the UE.

22. The method of claim 19, wherein the configuration comprises locations of SS blocks transmitted in an SS burst set.

23. The method of claim 19, wherein the at least one UE-specific configuration further comprises:
UE-specific resources for a random access (RACH) procedure.

24. The method of claim 23, further comprising:
transmitting at least one RACH preamble based, at least in part, on the UE-specific resources for the RACH procedure.

25. The method of claim 23, wherein
the RACH procedure comprises a contention-free RACH procedure, and
the UE-specific resources for the contention-free RACH procedure are based, at least in part, on the SS.

26. The method of claim 25, wherein the UE-specific configuration for the contention-free RACH procedure comprises an indication of beams associated with the BS to receive a RACH preamble and occasion during the RACH procedure.

27. The method of claim 19, wherein the configuration is based, at least in part, on a capability of the UE, wherein the capability includes at least one of:
a beam correspondence capability, a radio frequency (RF) capability, a number of antenna ports at the UE, or a communication schedule associated with the UE and another BS.

28. The method of claim 19,
wherein receiving the assignment comprises receiving a UE-specific configuration associated with transmissions from the target BS and receiving a UE-specific configuration associated with transmissions from the serving BS of the UE, and further comprising:
transmitting, to the serving BS of the UE, a measurement report associated with: SSs associated with the UE-specific configuration transmitted by the serving BS of the UE, and SSs associated with the UE-specific configuration transmitted by the target BS; and
receiving, from the serving BS of the UE, a mobility management command based, at least in part on the measurement report.

29. A first base station (BS) for wireless communication, comprising at least one processor and a memory coupled to the at least one processor, wherein the at least one processor is configured to:
assign at least one user equipment (UE)-specific configuration, wherein the at least one UE-specific configuration comprises:
an allocation of resources for at least one synchronization signal (SS) for mobility, an indication of a first SS of the at least one SS to be transmitted by a serving BS on the UE-specific resources and an indication of at least a second SS of the at least one SS to be transmitted by a target BS on the UE-specific resources, and a numerology associated with the first SS to be transmitted by the serving BS and a numerology associated with the second SS to be transmitted by the target BS; and communicate with the UE based, at least in part, on the UE-specific configuration.

30. An apparatus for wireless communication by a user equipment (UE) comprising, comprising at least one processor and a memory coupled to the at least one processor, wherein the at least one processor is configured to:

receive an assignment of at least one UE-specific configuration, wherein the at least one UE-specific configuration comprises:

an allocation of resources for a synchronization signal (SS) for mobility, an indication of a first SS of the at least one SS to be transmitted by a serving BS on the UE-specific resources and an indication of at least a second SS of the at least one SS to be transmitted by a target BS on the UE-specific resources, and a numerology associated with the first SS to be transmitted by the serving BS and a numerology associated with the second SS to be transmitted by the target BS; and communicate with a first BS based, at least in part, on the UE-specific configuration.

* * * * *